US009690566B2

(12) United States Patent
Vinograd et al.

(10) Patent No.: US 9,690,566 B2
(45) Date of Patent: Jun. 27, 2017

(54) SYSTEM AND METHOD FOR VIRTUAL ASSEMBLY PATCHING IN A CLOUD ENVIRONMENT

(71) Applicant: ORACLE INTERNATIONAL CORPORATION, Redwood Shores, CA (US)

(72) Inventors: Patrick Vinograd, Portland, OR (US); Chris Broadbent, Middleburg, VA (US); Padraic Russell, Portland, OR (US); Yonatan Graber, Tel Aviv (IL); Codanda Chinnappa, Burlington, MA (US); Rajiv Mordani, Sunnyvale, CA (US); Masoud Kalali, Uppsala (SE)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/213,936

(22) Filed: Mar. 14, 2014

(65) Prior Publication Data

US 2014/0282472 A1 Sep. 18, 2014

Related U.S. Application Data

(60) Provisional application No. 61/785,275, filed on Mar. 14, 2013, provisional application No. 61/798,720, filed on Mar. 15, 2013.

(51) Int. Cl.
*G06F 9/44* (2006.01)
*G06F 9/445* (2006.01)

(52) U.S. Cl.
CPC . *G06F 8/65* (2013.01); *G06F 8/63* (2013.01)

(58) Field of Classification Search
CPC .......................................................... G06F 8/65
(Continued)

(56) References Cited

U.S. PATENT DOCUMENTS 8,782,632 B1 * 7/2014 Chigurapati et al. ......... 717/172
2009/0007105 A1 * 1/2009 Fries et al. ......................... 718/1
(Continued)

FOREIGN PATENT DOCUMENTS

WO 2007035545 3/2007

OTHER PUBLICATIONS

Oracle Virtual Assembly Builder Data Sheet; Oracle website (www.oracle.com) as captured by the Wayback Machine Internet Archive (archive.org) on Dec. 19, 2012.*
(Continued)

*Primary Examiner* — Qing Chen
*Assistant Examiner* — Clint Thatcher
(74) *Attorney, Agent, or Firm* — Tucker Ellis LLP

(57) ABSTRACT

Described herein is a system and method for virtual assembly patching in a cloud environment. In accordance with an embodiment, a virtual assembly builder can be used to virtualize installed components in a reference environment, and then deploy those components into another destination environment. A user can capture the configuration and binaries of software components into software appliance artifacts, which can be grouped and their relationships defined as software assembly artifacts. In accordance with an embodiment, assemblies stored as disk images in a repository can be patched by creating replacement images, importing the replacement images into the virtualization environment, and then performing a replacement or swap of an instance's existing virtual disks, with patched versions of those disks.

19 Claims, 12 Drawing Sheets

(58) Field of Classification Search
USPC .......................................................... 717/170
See application file for complete search history.

(56) References Cited

U.S. PATENT DOCUMENTS

| | | | | |
|---|---|---|---|---|
| 2009/0125878 | A1 | 5/2009 | Cullum | |
| 2011/0078680 | A1* | 3/2011 | Lagergren et al. | 718/1 |
| 2012/0102480 | A1* | 4/2012 | Hopmann et al. | 717/172 |
| 2012/0102486 | A1 | 4/2012 | Yendluri | |
| 2013/0007733 | A1* | 1/2013 | Fries et al. | 718/1 |
| 2013/0055155 | A1* | 2/2013 | Wong et al. | 715/810 |
| 2013/0055253 | A1 | 2/2013 | Jubran | |
| 2013/0132945 | A1* | 5/2013 | Anderson et al. | 718/1 |
| 2013/0179872 | A1* | 7/2013 | Kuzmack et al. | 717/173 |
| 2014/0101649 | A1* | 4/2014 | Kamble et al. | 717/170 |

OTHER PUBLICATIONS

International Searching Authority at the European Patent Office, International Search Report and Written Opinion for PCT International Application No. PCT/US2014/029441, Jul. 1, 2014, 8 pages.

* cited by examiner

SYSTEM AND METHOD FOR VIRTUAL ASSEMBLY PATCHING IN A CLOUD ENVIRONMENT

CLAIM OF PRIORITY

This application claims the benefit of priority to U.S. Provisional Application titled "SYSTEM AND METHOD FOR PROVIDING A CLOUD COMPUTING ENVIRONMENT", Application No. 61/785,275, filed Mar. 14, 2013; and U.S. Provisional Application titled "SYSTEMS AND METHODS FOR GENERIC PRODUCT WIRING AND OTHER VIRTUAL ASSEMBLY BUILDER FEATURES", Application No. 61/798,720, filed Mar. 15, 2013, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems and methods for use with a cloud computing environment, and are particularly related to a system and method for virtual assembly patching in a cloud environment.

BACKGROUND

Generally described, virtualization is the process of abstracting computer hardware resources, such as its processor, memory, storage, and network interfaces, from an operating system and software applications running thereon. A computer can include a virtualization component, such as a hypervisor, which enables the installation of multiple operating systems, each of which are capable of running simultaneously and independently within their own secure environment. Virtualization can make deployment of complete processing environments faster, easier, and more efficient.

For example, a cloud environment enables responsibilities which previously may have been provided by an organization's own information technology department, to be delivered as service layers, for use by consumers that are either internal (i.e., private) or external (i.e., public) to the organization. Cloud environments can utilize virtualization features to quickly and easily modify how a particular service should be configured, provisioned, and controlled. These are some examples of the types of environments in which embodiments of the invention can be used.

SUMMARY

Described herein is a system and method for virtual assembly patching in a cloud environment. In accordance with an embodiment, a virtual assembly builder can be used to virtualize installed components in a reference environment, and then deploy those components into another destination environment. A user can capture the configuration and binaries of software components into software appliance artifacts, which can be grouped and their relationships defined as software assembly artifacts. In accordance with an embodiment, assemblies stored as disk images in a repository can be patched by creating replacement images, importing the replacement images into the virtualization environment, and then performing a replacement or swap of an instance's existing virtual disks, with patched versions of those disks.

DETAILED DESCRIPTION

As described above, virtualization is the process of abstracting computer hardware resources, such as its processor, memory, storage, and network interfaces, from an operating system and software applications running thereon. For example, a computer can include a virtualization component, such as a hypervisor, which enables the installation of multiple operating systems, each of which are capable of running simultaneously and independently within their own secure environment.

In accordance with an embodiment, a virtual assembly builder can be used to virtualize installed components in a reference environment, and then deploy those components into another destination environment. A user can capture the configuration and binaries of software components into software appliance artifacts, which can be grouped and their relationships defined as software assembly artifacts.

In accordance with an embodiment, assemblies stored as disk images in a repository can be patched by creating replacement images, importing the replacement images into the virtualization environment, and then performing a replacement or swap of an instance's existing virtual disks, with patched versions of those disks.

Virtual Assembly Builder (VAB)

Figure 1:
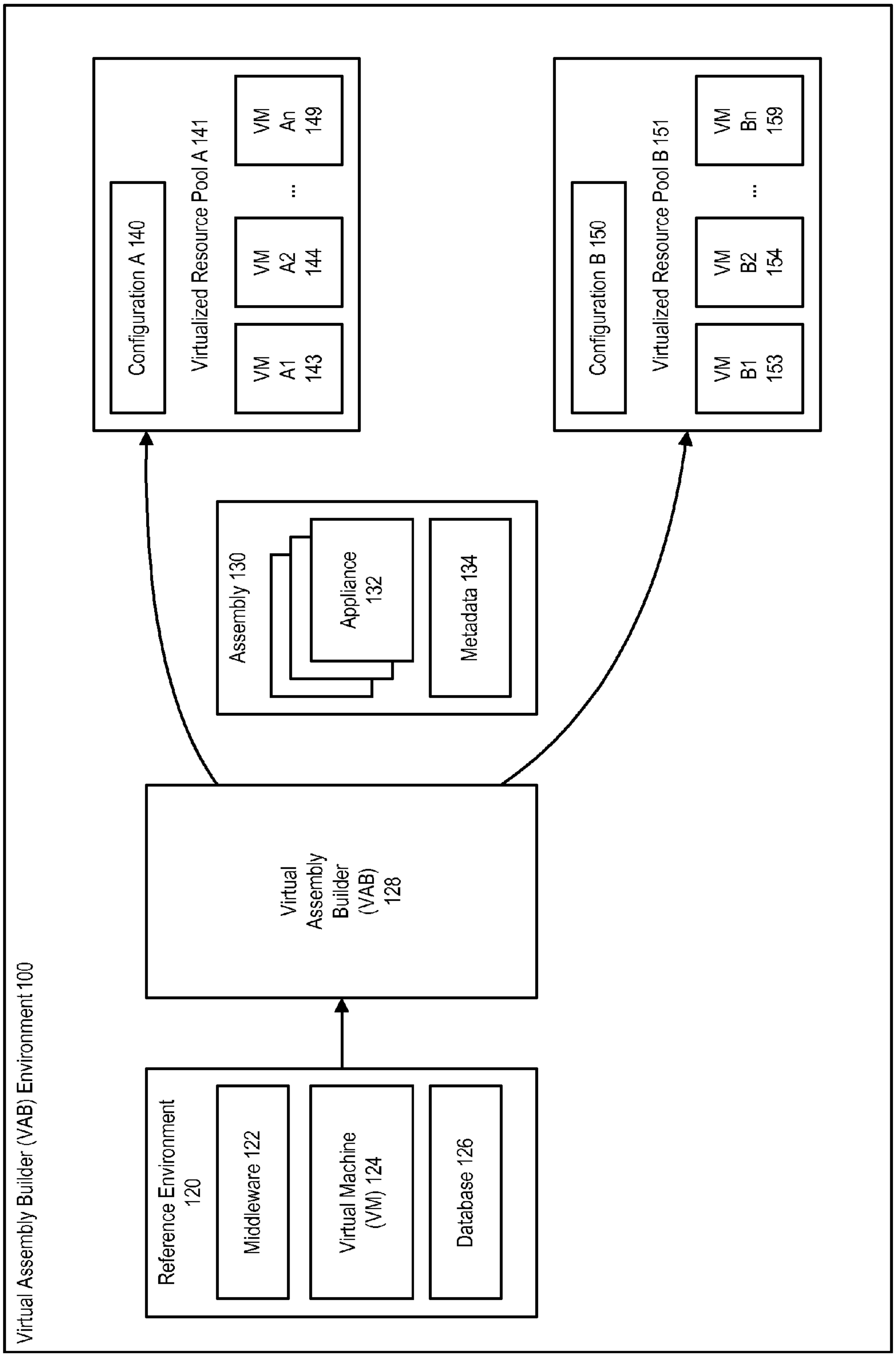
FIG. 1 illustrates a virtual assembly builder environment, in accordance with an embodiment.

FIG. 1 illustrates a virtual assembly builder environment 100, in accordance with an embodiment. As shown in FIG.

1, a virtual assembly builder (VAB) 128 (e.g., Oracle Virtual Assembly Builder, OVAB) can be used to introspect a reference environment 120, which includes one or more installed software components, such as middleware 122, virtual machine 124, and/or database components 126. The virtual assembly builder can then prepare one or more assemblies 130, each of which includes an appliance 132 and associated metadata 134, for deployment into a destination environment having one or more virtualized resource pools 141, 151, of virtual machines or servers 143, 144, 149, 153, 154, 159, according to one or more configurations 140, 150.

In accordance with an embodiment, a virtual appliance (generally referred to herein as an appliance) represents a software component and its local execution environment. For example, an appliance can include an application configuration, binaries, and operating system.

In accordance with an embodiment, a virtual assembly (generally referred to herein as an assembly) is a collection of interrelated appliances that are configured to work together upon deployment to a pool of hardware resources. Assemblies may also provide capabilities that increase their usefulness in a production environment, such as support for externalized configuration in the form of metadata; a means of defining a start order of appliances to reflect interdependencies; and/or support for referencing external systems such as databases, servers, or security providers.

In accordance with an embodiment, the virtual assembly builder can include a visual or command-line configuration environment, or other tool or interface, which enables users to construct assemblies encompassing complex application structures. For example, interfaces can be provided that allow a user to browse and re-use a catalog of existing appliances and assemblies, or to modify connections between appliances using drag-and-drop or editable properties.

In accordance with an embodiment, assembly creation and deployment is a multi-step process. In an introspect phase, a user can capture configuration metadata for individual or multiple distributed software components. Target components may reside locally or remotely, on systems that may be physical or virtual.

In a configure phase, the user can use one or more interfaces to configure assemblies, for example by dragging-and-dropping appliances maintained in a navigable catalog; establishing relationships between appliances; and/or creating connections from appliances to external resources such as databases, servers, or security providers.

In a prepare phase, the user can create bootable virtual machine disk images, which include a customized operating system (OS) distribution and configurable metadata that allows for deploy-time customization of the software component.

In a deploy phase, the user can discover targets that are available in a virtualized environment; create customized deployment configurations; stage appliance disk images; deploy assemblies onto targets; scale appliance instances if required; and automatically wire deployed instances to existing assemblies.

For example, in accordance with an embodiment, a virtual assembly builder can be used as described above, to capture an existing condition of a set of Oracle Fusion Middleware (FMW) and Oracle Database software components from a source environment, represent the components as assemblies, and enable their deployment into a destination environment.

Figure 2:
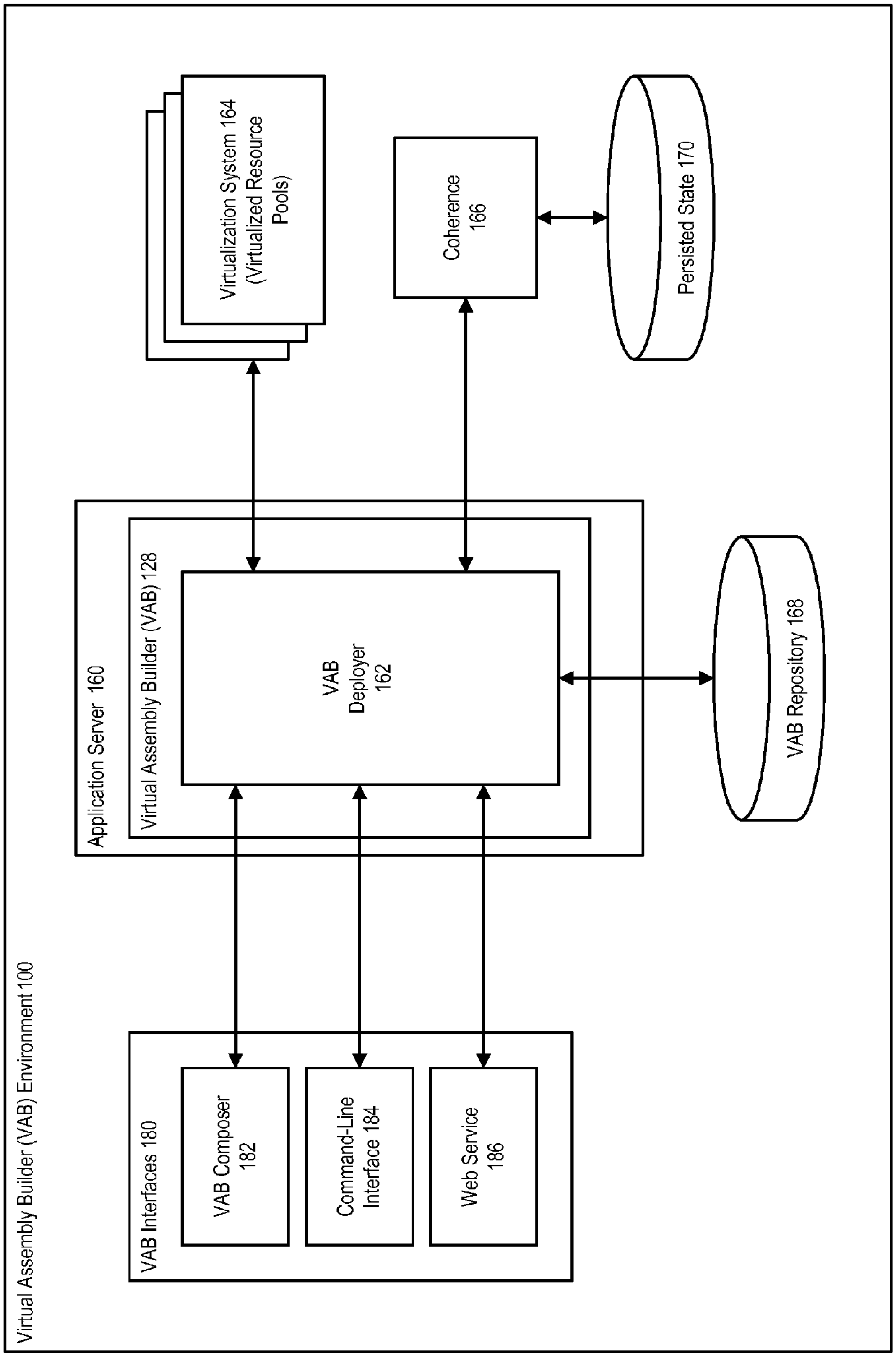
FIG. 2 further illustrates a virtual assembly builder environment, in accordance with an embodiment.

FIG. 2 further illustrates a virtual assembly builder environment, in accordance with an embodiment. As shown in FIG. 2, in accordance with an embodiment, a virtual assembly builder environment can include a VAB deployer 162, hosted at an application server 160, which provides access to one or more virtualization systems having resource pools 164, a VAB repository 168, and a storage component (e.g., Oracle Coherence) 166 that enables persistence of state 170. Access to the VAB deployer and its operations can be provided by one or more VAB interfaces 180, for example a VAB composer component 182, a command-line interface 184, or a Web service 186 or other interface.

In accordance with an embodiment, the VAB interfaces allow a user to perform the introspect, configure, and prepare phases of assembly creation; and also provide support for uploading, registering, and managing assembly archives and instances. For example, the VAB deployer maintains a repository of assembly archives created by the interfaces, and provides operations for registering assemblies to virtualized systems (e.g., Oracle VM, OVM), and orchestrating the deployment of software components defined by the archives.

A minimal appliance generally includes a metadata describing the condition of the original software component, together with a set of component-specific files that allow its configuration to be recreated at deployment time. While an assembly is being prepared for deployment, additional configuration information can be stored with the metadata. In accordance with an embodiment, the metadata includes a description of each of the component's logical inputs and outputs, collectively referred to as endpoints. For example, the HTTP input, and mod_wl_ohs output, of an HTTP server are examples of input and output endpoints respectively. Endpoints can include information such as protocols, ports, and URLs. The virtual assembly builder captures enough information about each endpoint to allow connections to be updated after a component is captured and before it is deployed. This helps ensure that appliances can be connected correctly within the destination environment.

In accordance with an embodiment, the introspection process generates file set definitions that specify one or more file system hierarchies that must be captured to reproduce the component installation in the destination environment. The virtual assembly builder may also capture a copy of the actual installation described by the metadata, referred to herein as a file set. In accordance with an embodiment, the virtual assembly builder creates an XML description of the component, which provides a snapshot of the component's configuration at the time of introspection.

In accordance with an embodiment, introspection can be plugin-based, including the use of a plugin for each supported component type. In most cases, the result of introspecting a component is an appliance; however, in some cases, such as when the virtual assembly builder is used to introspect an application server domain, the associated introspector plugin can generate an assembly, for example with an appliance representing the domain's administration server, and other appliances representing domain managed servers.

In accordance with an embodiment, generic appliances can be constructed using a "GenericProd" appliance type, which allows the user to create and deploy an application product as an appliance, for which the virtual assembly builder might not have built-in support. Such appliances generally do not make use of product-specific logic to capture configuration or product location; instead, a relatively simple appliance is created and a set of user-supplied properties, paths, and scripts that make up the product are added. The set of scripts passed at creation can be subsequently executed at deployment to perform any required operations.

In accordance with an embodiment, assemblies and appliances can be represented in a persistent storage, such as a disk, in an area referred to as the catalog. Assembly and appliance artifacts, and metadata, can be stored in nested directories within subfolders of the catalog's root directory.

In accordance with an embodiment, an assembly template is a set of virtual disk images that can be used to create and start new virtual machine instances. Templates comprising a guest operating system, and appliance file sets and metadata, can be created for each appliance in an assembly, and then made available to virtualized environments by registering them to that environment, at which point virtual machine instances can be created based on the templates.

In accordance with an embodiment, when defining an assembly, it may be necessary to reference servers or resources that lie outside the assembly. For example, an organization's environment may include external resources such as databases, servers, or security providers that are shared by many unrelated virtual deployments. In accordance with an embodiment, external components can be defined in templates to represent resources that exist in an environment but will not be deployed as appliances. Representing these as external resources ensures that the referencing appliances within the assembly are correctly configured at deployment time.

In accordance with an embodiment, a deployment plan can be used to specify a network in a virtualization environment to be used for each logical network declared in an assembly archive. A user can create a deployment plan which customizes default assembly and appliance properties, and provides deployment-specific information such as a network configuration. For example, in accordance with an embodiment, the VAB deployer can create and attach one or more hypervisor virtual networks (Vnets) to the virtual machines it interacts with.

Different virtualization systems organize their resources in different ways, and require different information for referencing and accessing those resources. In accordance with an embodiment, to provide a common user experience across different systems, targets can be used to reference a resource or pool of resources in a virtualized system. The configuration information provided for each target is specific to the virtualization system containing the target. An assembly instance is a deployable instance of an assembly archive for a specific target virtual environment; while an appliance instance is an instance of an appliance running or created in the target virtual environment.

Assembly instances can be associated with a lifecycle. For example, a user can create an assembly instance by selecting an assembly, a deployment plan, and a target to which the assembly must be deployed. Deployment of an assembly instance will then transition through various phases, for example, staged, deployed, and failed, during each of which phases a subset of operations can be made available. For example, when an assembly instance is deployed, the user can start and stop appliance instances, or increase or decrease the number of appliance instances associated with the deployed assembly instance.

Virtual Assembly Builder with Cloud Environments

In accordance with various embodiments, a virtual assembly builder can be used with a cloud computing environment, for example an environment that utilizes hardware and software to enable a cloud-based platform for developing and deploying software applications.

Figure 3:
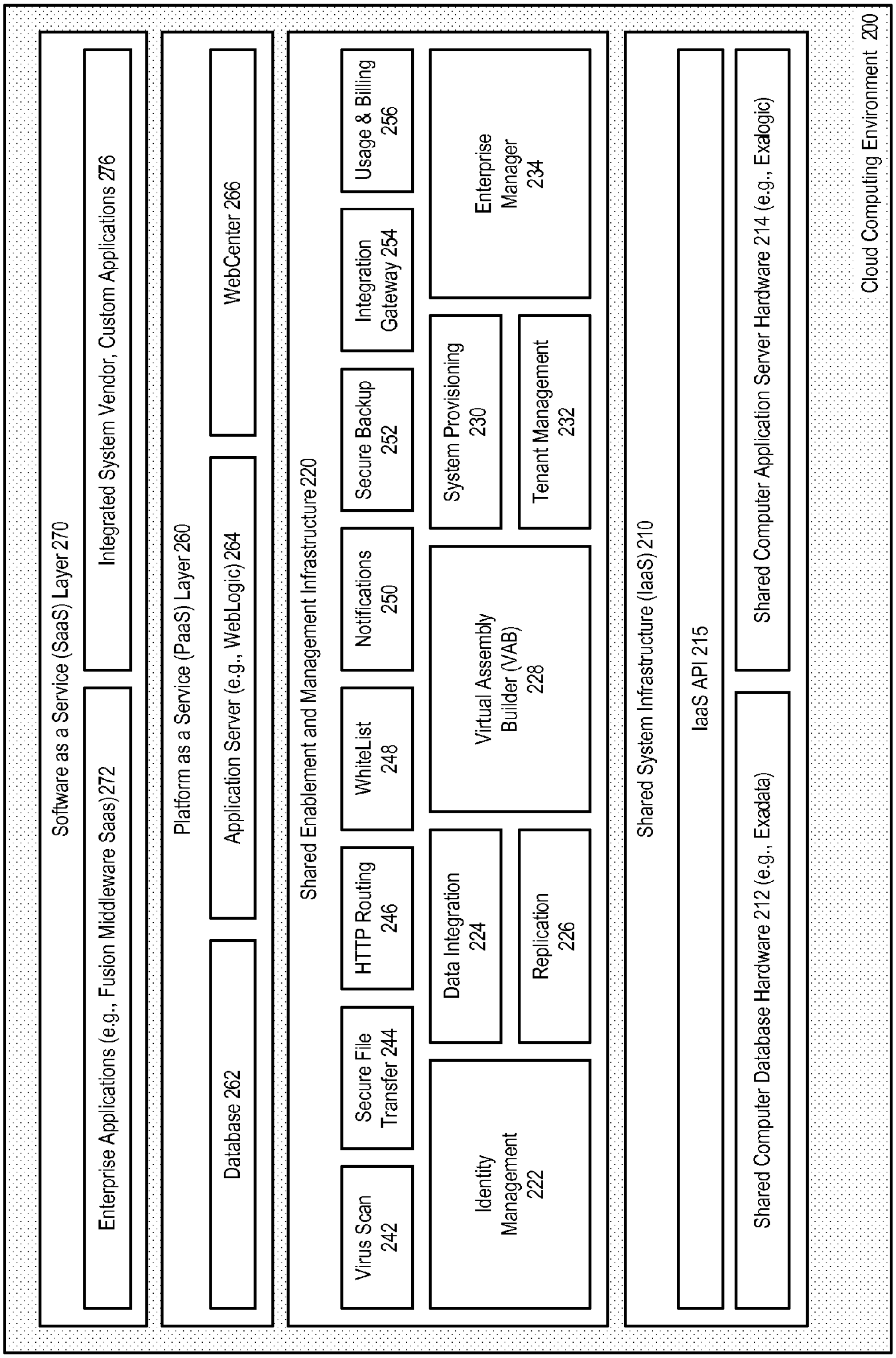
FIG. 3 illustrates an exemplary cloud computing environment, which can utilize a virtual assembly builder, in accordance with an embodiment.

FIG. 3 illustrates an exemplary cloud computing environment, which can utilize a virtual assembly builder, in accordance with an embodiment. As shown in FIG. 3, a cloud computing environment (referred to herein in some embodiments as a cloud environment, or cloud) 200 can include a combination of one or more Infrastructure as a Service (IaaS) layer 210, Platform as a Service (PaaS) layer 260, and/or Software as a Service (SaaS) layer 270, which can be used by consumers that are private or public to an organization depending on the particular cloud computing model being used.

In accordance with an embodiment, the cloud environment can be implemented as a system that includes a computer hardware such as one or more conventional general purpose or specialized digital computers, computing devices, machines, microprocessors, memory and/or computer readable storage media. For example, in accordance with an embodiment, the IaaS layer can include a shared database hardware (e.g., an Exadata machine) 212, and/or a shared application server hardware (e.g., an Exalogic machine) 214, which are accessible via an IaaS API 215. The PaaS layer can include one or more PaaS services, such as a database service 262, application service 264, and/or WebCenter service 266; while the SaaS layer can include various SaaS services, such as enterprise applications (e.g., Oracle FMW SaaS) 272, and/or ISV or custom applications 276. The cloud environment can also include a shared enablement and management infrastructure 220 which provides tools that support the various service layers, for example, one or more identity management 222, data integration 224, replication (e.g., Oracle GoldenGate) 226, virtual assembly builder 228, system provisioning 230, tenant management 232, enterprise manager 234, virus scan 242, secure file transfer 244, HTTP routing 246, whitelist 248, notifications 250, secure backup 252, integration gateway 254, usage and billing 256, or other components.

Figure 4:
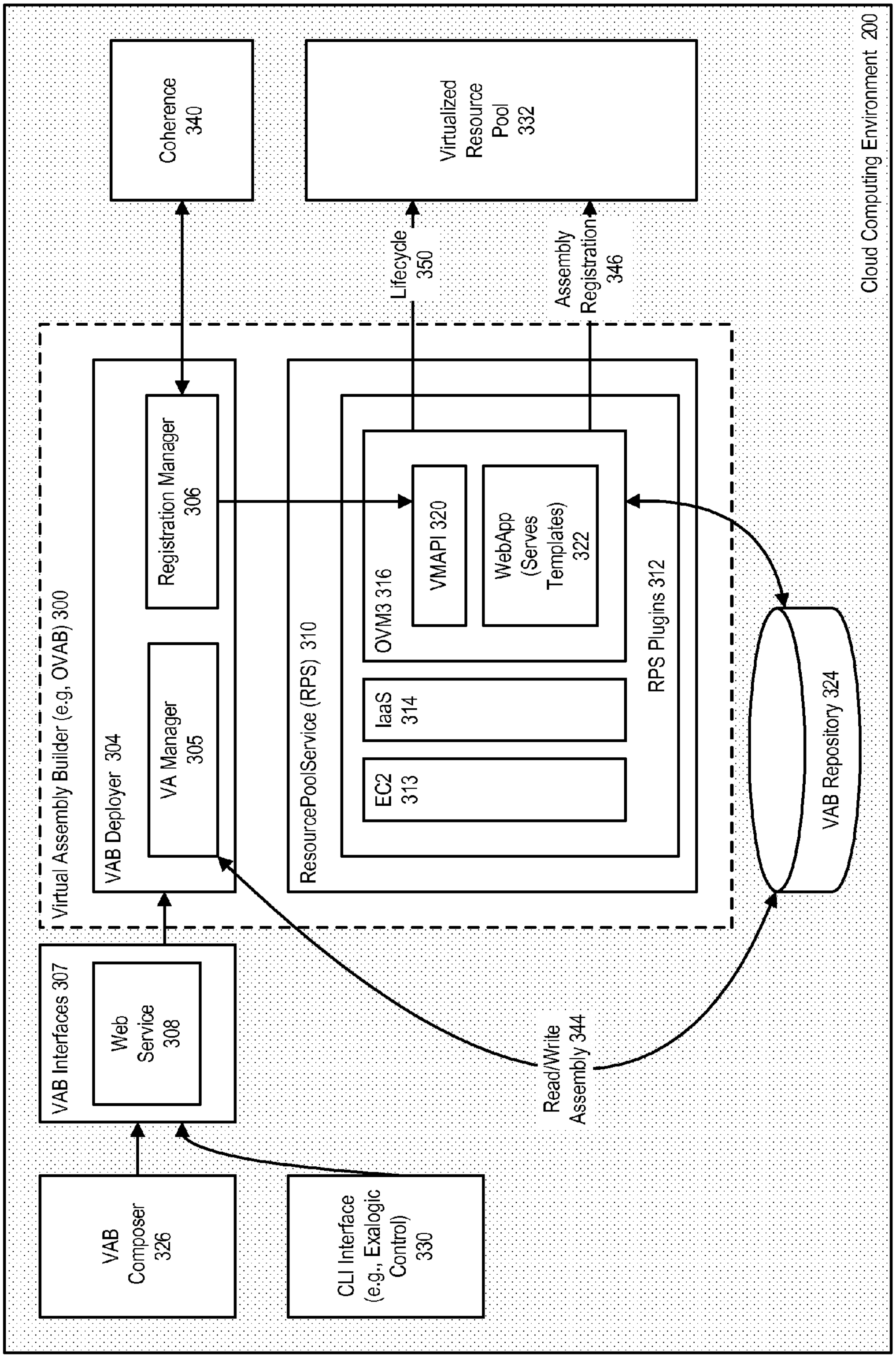
FIG. 4 illustrates the use of a virtual assembly builder in a cloud computing environment, in accordance with an embodiment.

FIG. 4 illustrates the use of a virtual assembly builder in a cloud computing environment, in accordance with an embodiment. As shown in FIG. 4, in accordance with an embodiment, a virtual assembly builder component 300 maintains a repository 324 of assembly archives. In accordance with an embodiment that uses OVAB, the assembly archives can be Oracle Virtual Assembly (OVA) format archives.

As described above, in accordance with an embodiment, assemblies can be created using a VAB composer 326, command-line interface 330, or other configuration product such as OVAB Studio. A VAB deployer component 304 can be accessed, for example, by a Web service 308 or other VAB interface 307, and enables operations for uploading 344 assemblies to the repository, and registering assemblies with cloud components.

In accordance with an embodiment, the VAB deployer can be deployed within an application server or administration server, or within a collection of managed servers. Multi-instance embodiments can utilize a shared database, disk, or storage functionality as provided by, e.g., Coherence 340, for storage of the deployer's runtime and configuration state.

In accordance with an embodiment, the VAB deployer can include a virtual assembly manager 305 for enabling access to the repository, and a registration manager 306 which provides access to a resource pool service (RPS) 310 that supports the use of one or more resource pool service plugins 312, for example, Oracle VM 3 (OVM3) 316, IaaS 314, and/or EC2 313 plugins. In accordance with an embodiment, a plugin can support the use of a VM message API (VMAPI) 320, and templates 322, which enable the registration of assemblies 346 with a resource pool 332 or virtual machine (VM), and their subsequent lifecycle management 350.

Some virtualization systems allow tags to be associated with artifacts such as templates or VM instances, which can then be queried, for example to find artifacts associated with a particular deployment.

As part of the virtual assembly builder's lifecycle, assemblies can be uploaded to the VAB deployer's repository, e.g., using an UploadAssemblyArchive operation. An assembly can then be registered with one or more targets, e.g., using a RegisterAssemblyArchive operation. Registration can include registering the assembly's templates with a resource pool within the virtual assembly builder environment. After an assembly has been registered with a target, one or more deployments can be created for that registration, e.g., using a CreateAssemblyInstance operation. Once a deployment has been created, the initial instances for the assembly can be created and started. While this is being performed, the VAB deployer can use a rehydration logic embedded in the initialization scripts of those instances, to rehydrate the assembly, including configuring various aspects of the assembly, such as its operating system, networks, or disk volumes.

In accordance with an embodiment, the VAB deployer can configure a virtual machine application stack for use within an environment. For example, information can be provided for configuring connections between service instances that are to be created when the application starts up. Once an assembly has been deployed, additional lifecycle operations can be applied to the running system, such as scaling to increase or decrease the number of running instances for a particular appliance within an assembly.

Figure 5:
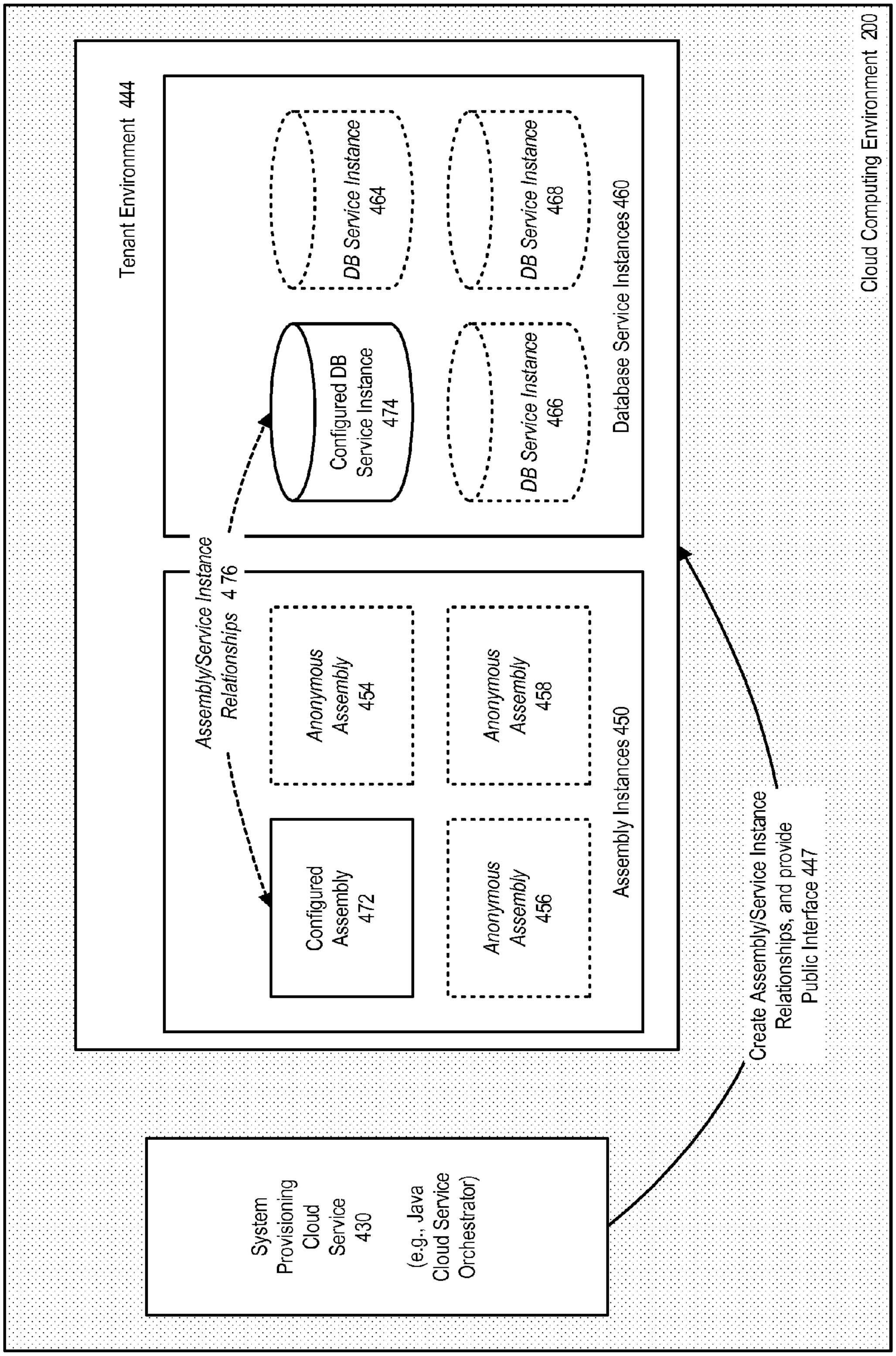
FIG. 5 illustrates an exemplary use of a virtual assembly builder in a cloud computing environment, in accordance with an embodiment.

FIG. 5 illustrates an exemplary use of a virtual assembly builder environment in a cloud computing environment, in accordance with an embodiment. For example, a cloud environment such as Oracle Public Cloud (OPC) can include a Java cloud services infrastructure, which allows a suite of software applications, middleware, and database offerings to be delivered to customers in a self-service manner.

As shown in FIG. 5, in accordance with an embodiment, a system provisioning cloud service 430 can receive an order, from a customer, for a tenant environment to be created 444, including assembly instances 450 and/or service instances 460. The system can initially create 447 a plurality of anonymous assemblies (e.g., 454, 456, 458) and service instances (e.g., 464, 466, 468). Each of the assembly and/or service instances can then be configured to meet the order requirements. For example, a particular assembly 472, and/or a particular service instance 474, can be configured to work together. In the context of a Java cloud service, the resultant platform instance can contain the resources and relationships 476 that are required to provide a WebLogic or other application server service, together with, e.g., an instance database, administration server, and one or more application servers.

Virtual Assembly Patching

As described above, using a virtual assembly builder, a user can capture the configuration and binaries of software components into software appliance artifacts, which can be grouped and their relationships defined as software assembly artifacts.

In accordance with an embodiment, assemblies stored as disk images in a repository can be patched by replacing or swapping an instance's existing virtual disks with patched versions of those disks.

Assembly patching leverages the virtual assembly builder's knowledge of an assembly structure, and its ability to manage virtual disks that are attached to an assembly instance. In accordance with an embodiment, the process of assembly patching includes building replacement disk images; importing the replacement images into the virtualization environment; and performing a replacement or swap of an instance's existing virtual disks, with patched versions of those disks.

In accordance with an embodiment, the virtual assembly builder supports disk-swapping for binary patches of binary-only disks.

As referred to herein, a binary-only disk is one in which the contents are not modified by an appliance at runtime; for example, it may contain only product binaries or read-only data. A binary patch generally comprises one or more file addition, removal, or update operations. As such, binary patches can easily be applied to a mounted disk image, and binary-only disks can be safely swapped out with a patched version, without risk of losing data that might have been written during the appliance runtime.

In contrast, a configuration patch may comprise more general scripting actions.

Since not all product patches may be strictly binary patches, but might also contain some scripting elements, in accordance with an embodiment, the virtual assembly builder can support methods that allow more general types of patching operations, referred to herein as config migration, and config patching conduit.

When config migration is used while applying a binary patch, an additional well-defined content of an original disk can also be copied to a replacement disk. This method is suitable for use in those situations in which a disk contains binaries, together with a few well-known data files.

When config patching conduit is used, the virtual assembly builder supports executing commands, such as a script invocation, on a deployed appliance instance. This method can be used to support patching operations that cannot be fully accomplished through regular disk swapping or config migration, such as OS patching which typically requires extensive configuration changes after appliance startup.

Command Execution Engine (CEE)

Some virtual assembly builder environments, such as OVAB, can deploy a wide variety of different appliances. Due to the general nature of the appliances deployed, connectivity to those appliances cannot be assumed. For example, the virtual assembly builder may not possess sufficient credentials to access the destination virtualization system, or the destination system may not be network-accessible.

To help address this, in accordance with an embodiment, the VMAPI can support the use of a command execution engine (CEE), which can be implemented as a listener associated with an appliance, that handles a specific set of messages from the VMAPI, and executes shell commands passed in that manner.

In accordance with an embodiment, the CEE can be provided as a daemon associated with the appliance (for example, in an OVAB environment as an AB.img utility mount included with each OVAB deployed appliance), which listens to CEE-specific messages from the VMAPI and executes them. Use of a CEE can provide a more robust remote command invocation mechanism that does not depend on factors such as credentials and network connectivity.

Some of the examples provided herein illustrate assembly patching operations in an environment in which the user has uploaded, to the VAB repository, an assembly archive mySite version 1 which contains a product appliance myAppliance associated with a disk sys-MiddlewareHome.img that contains a Home directory (e.g., an Oracle Home in the case of an Oracle product); that the user has downloaded an OPatch p1234567.zip applicable to the product type, version, and architecture contained in myAppliance; and that the user has registered and deployed an instance of the mySite assembly to a virtualization system, using one or more virtual disks or other form of disk storage.

Figure 6:
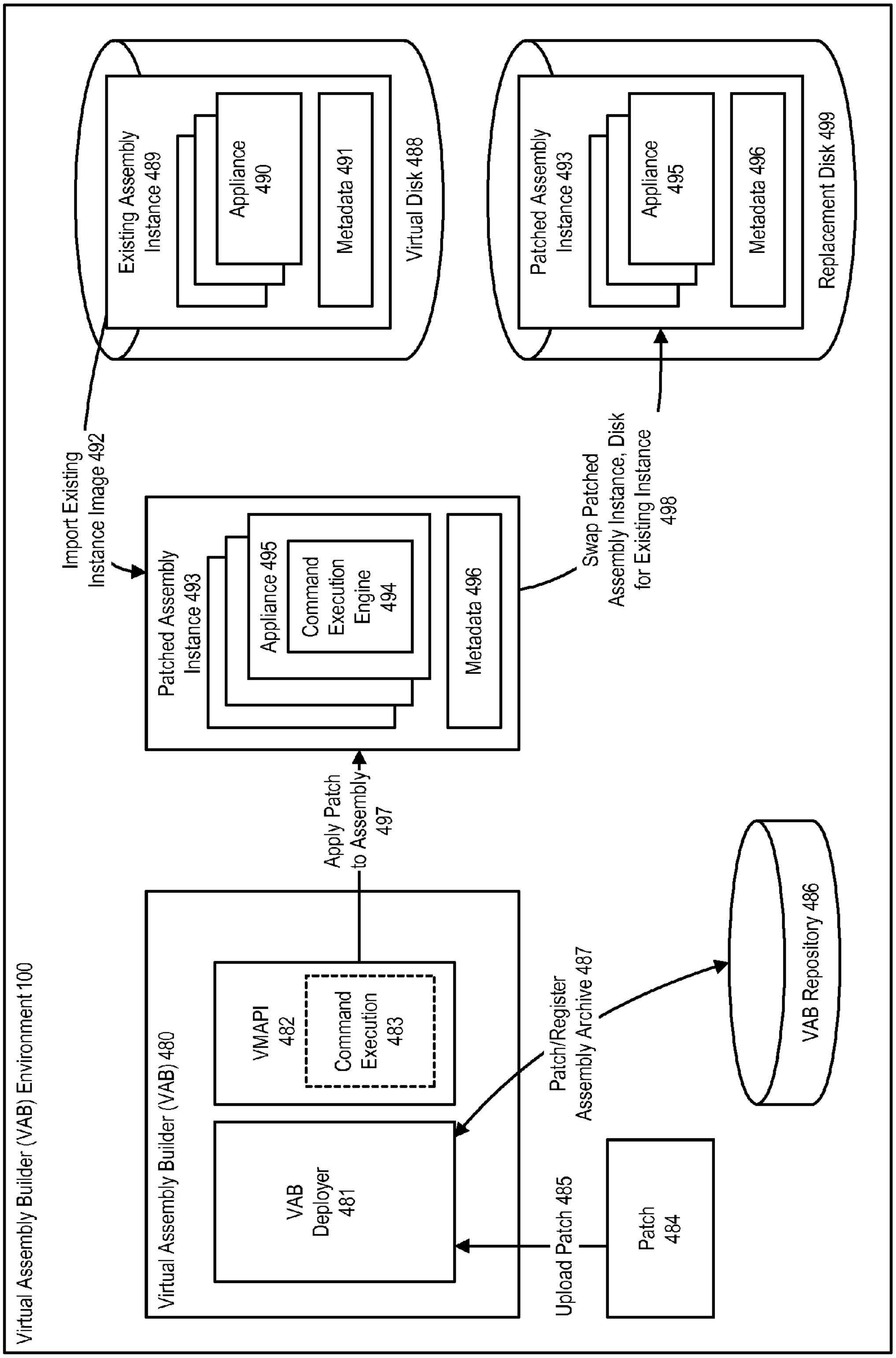
FIG. 6 illustrates a system for virtual assembly patching, in accordance with an embodiment.

FIG. 6 illustrates a system for virtual assembly patching, in accordance with an embodiment. As shown in FIG. 6, in accordance with an embodiment, a virtual assembly builder 480, with a VAB deployer 481, and a VMAPI 482 which can optionally include CEE extension support 483, can be used to patch assembly instances stored as images on virtual disks, or at another storage component (e.g., an assembly volume, or at a Coherence environment).

In accordance with an embodiment, the VAB repository 486 enables one or more patches 484 to be uploaded 485, and registered 487 with an assembly archive. The process of assembly patching includes building replacement disk images, importing the replacement images into the virtualization environment, and replacing or swapping an instance's existing virtual disks, with patched versions of those disks.

For example, in accordance with an embodiment, an existing assembly instance 489 (e.g., mySite), stored in a virtual disk 488 as a virtual machine disk image, and having one or more appliances 490, and metadata 491, can be imported 492 into the virtualization environment.

The corresponding assembly archive can then be patched 497, optionally using an appliance CEE 494, with one or more patches registered for that assembly, to create a replacement assembly 493 having one or more updated appliances 495, and metadata 496.

In accordance with an embodiment, the (now patched) replacement assembly can be swapped in 498 for the original/existing disk, as a replacement virtual disk 499, to patch the assembly instance.

As described in further detail below, in accordance with an embodiment, the patching process generally includes the steps of creating an assembly patch; uploading the patch; patching an assembly archive; registering the assembly archive; and patching an assembly instance, which can be performed using a variety of patching-related operations. Various patching-related operations are described herein for purposes of illustration, in accordance with other embodiments, different and/or additional patching-related operations and functionality can be provided.

Creating an Assembly Patch

In accordance with an embodiment, a CreateAssemblyPatch operation takes an existing product patch, and maps the patch onto an assembly, for example by identifying the path to the appliance within the assembly, and the location of the product Home (e.g., Oracle Home) within the appliance.

The output of this operation is an assembly patch, for example a zip file containing a product patch archive and a metadata.

In accordance with an embodiment, an assembly patch can contain multiple product patches per appliance, and/or one or more product patches for multiple appliances. The assembly patch metadata can include information such as a list of virtual disks to exclude from the disk swapping process, or one or more sets of files to copy during a config migration.

Uploading a Patch

In accordance with an embodiment, an UploadPatch operation presents the assembly patch created in the previous step to the VAB deployer, for storage in the VAB repository.

When a patch is uploaded, it can be associated with (although it is not yet attached or applied to), a particular assembly archive version within the repository. The patch can be subsequently applied to that assembly archive version, or to its descendant versions, but cannot be applied to other assembly archives in the same VAB repository.

In accordance with an embodiment, the patch can be associated with a name that is unique in the context of a specified assembly and version. An example usage of the UploadPatch operation is shown below:

uploadPatch -patchFile -patchId -assemblyName -assemblyVersion -connectionName

In accordance with an embodiment, the process of uploading a patch can include communicating the patch file using, e.g., HTTP, to the virtual assembly builder's server, which writes the file to a temporary file, extracts the patch archive, and saves patch artifacts such as disk images and a patch.xml metadata file, in the VAB repository file system, in a directory [assembly]/[version]/patches/[patch-name].

Patching an Assembly Archive

In accordance with an embodiment, a PatchAssemblyArchive operation applies the product patches in an assembly patch to the appropriate appliance and product Home (e.g., Oracle Home). The VAB deployer extracts the appropriate disk images from the original assembly archive, stages them, and applies the patches, to create new disk images.

In accordance with an embodiment, the output of this operation is a new revision of the assembly archive. From the user's perspective, the new archive revision is a full-fledged assembly archive that can be downloaded, registered, and deployed, as with other assembly archives. The patched disks that comprise this new archive can also be applied to existing assembly instances that were created from the original assembly archive.

For example, if an assembly "foo" of version 1 is patched with a revision "patch1", then a new assembly archive with name "foo" and version "1-patch1" will be created in the local repository. After patching an assembly archive, and registering the archive with a target, the user will be able to patch a running instance to that revision.

The nature of disk swapping, in that it performs a full patched disk replacement and not a delta change to the data stored thereon, means that, in the context of the virtual assembly builder, a patch sequence (i.e., a patch on top of another patch) is unmanaged. Patching of a previously patched instance is possible, but if the patch needs to swap an already-patched disk, then the user must verify that the new patch does not unnecessarily cancel out the old patch.

In accordance with an embodiment, patching an assembly archive is an asynchronous operation. When a request is initiated, the VAB deployer will return a request identifier (ID) which a user can use to query the status of the request, e.g., using a DescribeRequests command. The relevant assembly instance is locked from the time that the operation starts, and stays locked during its execution. An example usage of the PatchAssemblyArchive operation is shown below:

```
patchAssemblyArchive -patchId -assemblyName -version -connection-
Name
            -revisionId -description [-waitForComplete] [-pollTime]
```

In accordance with an embodiment that uses OVAB, applying a patch to an assembly archive includes unpacking an OVA file, mounting the relevant image for each appliance, executing OPatches for each appliance, and repacking the images into a new OVA file. The changed images can be stored separately, to allow individual disk swapping in deployed assembly patching environments.

Registering an Assembly Archive

In accordance with an embodiment, a RegisterAssemblyArchive operation presents the patched disk images to the virtualization environment, in the same manner any other assembly archive might be registered. The VAB deployer can detect whether the base assembly archive is already registered, and if so only register the patched disks.

Registering a Patched Archive with a Target

In accordance with an embodiment a RegisterPatchedArchive operation presents the patched product disks to a virtualization target (for example, IaaS, OVM, or another target).

In accordance with an embodiment, the virtual assembly builder will attempt to register the minimal amount of data possible. For example, if an earlier version of the same assembly archive is already registered, then the virtual assembly builder will only register those disks that have changed relative to the previous version.

In accordance with an embodiment, after registering an assembly archive, the VAB deployer can check if any patched disks need to be uploaded to the target as well, and upload those as necessary.

Patching an Assembly Instance

In accordance with an embodiment, a PatchAssemblyInstance operation swaps out the existing virtual disks of an assembly instance for their patched versions.

This operation applies to the assembly as a whole, so each appliance that requires patching will have its appropriate disks swapped. If an appliance is in a started state prior to this operation, then the appliance will be stopped and restarted later as part of the disk swapping process.

At this point, the assembly instance is patched to the target version. For example, describing the instance would show that it is based on the patched revision of the assembly archive. If any appliance in the assembly is scaled, then the newly-scaled appliance instance would be created from the patched version of the assembly.

In accordance with an embodiment, the PatchAssemblyInstance operation enables upgrading an assembly from a current version, to a patched revision assembly, by swapping out binary read-only disks with patched replacement disks. In accordance with an embodiment, the instance must be either in staged or deployed modes in order to start the process. If a failure is detected during the application of a patch, the system will automatically perform the necessary cleanup/rollback, to attempt to return the assembly instance to its prior state.

In accordance with an embodiment, this is an asynchronous operation, including that when a request is initiated, the VAB deployer will return a request ID which a user can use to query the status of the request. An example usage of the PatchAssemblyInstance operation is shown below:

```
patchAssemblyInstance -toVersion -assemblyInstanceId -force
                    -connectionName [-waitForComplete] [-pollTime]
```

In accordance with an embodiment, the operation of applying a swap-out patch to an assembly instance can include creating volumes out of patch snapshots (which can be referenced, e.g., from a Patch-Cache); attaching each of the new patched volumes to the appliance; mounting the new patched volume alongside the unpatched volumes; copying zero or more file sets to the patched disk; executing zero or more migration scripts from the patched disk; unmounting and detaching the volumes; seeking out the needed volumes and swapping the old volumes with the patched volumes; turning on the assembly; marking the instance as patched, e.g., in AssemblyInstance-Patch-Cache (for scaling and display); and marking the assembly version as the patch with the patch revision.

Patch Versioning

Figure 7:
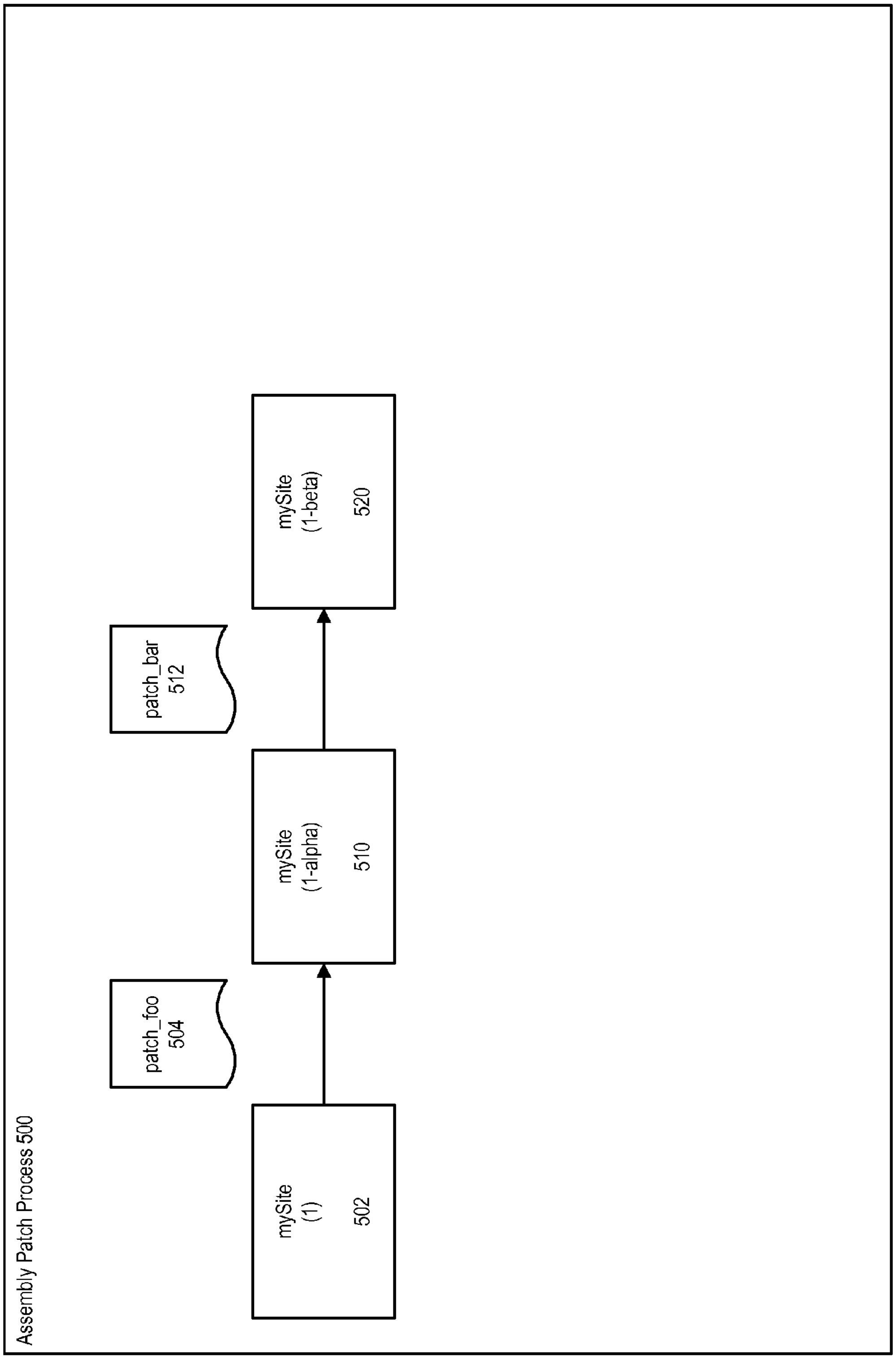
FIG. 7 illustrates a virtual assembly patch process, in accordance with an embodiment.

FIG. 7 illustrates a virtual assembly patch process 500, in accordance with an embodiment.

In accordance with an embodiment, each assembly archive in the VAB repository is associated with an assembly name and version. For assembly archives with the same name, versions are generally assigned sequentially, although there is no guarantee that assemblies of the same name are related to one another in any way. When an assembly archive is patched, the result is a new revision of the archive. This new assembly archive is related to the original archive, and the virtual assembly builder can keep track of that relationship.

For example, as shown in FIG. 7, if mySite version 1 (502) assembly archive is patched with patch "foo" 504, it may result in mySite version 1-alpha (510). The mySite_1 archive is considered the parent of the mySite_1-alpha archive.

An additional assembly patch "bar" 512 may be uploaded and applied to mySite_1-alpha, resulting in mySite_1-beta (520) which contains the cumulative contents of both assembly patches. Each of these three revisions can be considered a full-fledged assembly archive that may be concurrently registered and deployed.

In accordance with an embodiment, if a new version of the mySite assembly archive is uploaded using the uploadAssemblyArchive command, then it would be considered a mySite version 2 archive, and would have no specific relationship to version 1, 1-alpha, or 1-beta. As such, it cannot be assumed to contain any of the patches that were applied to version 1 or its descendents, and indeed may not even contain the same assembly. In accordance with an embodiment, there is only a known relationship between a given base assembly archive and its patch-based descendants.

Figure 8:
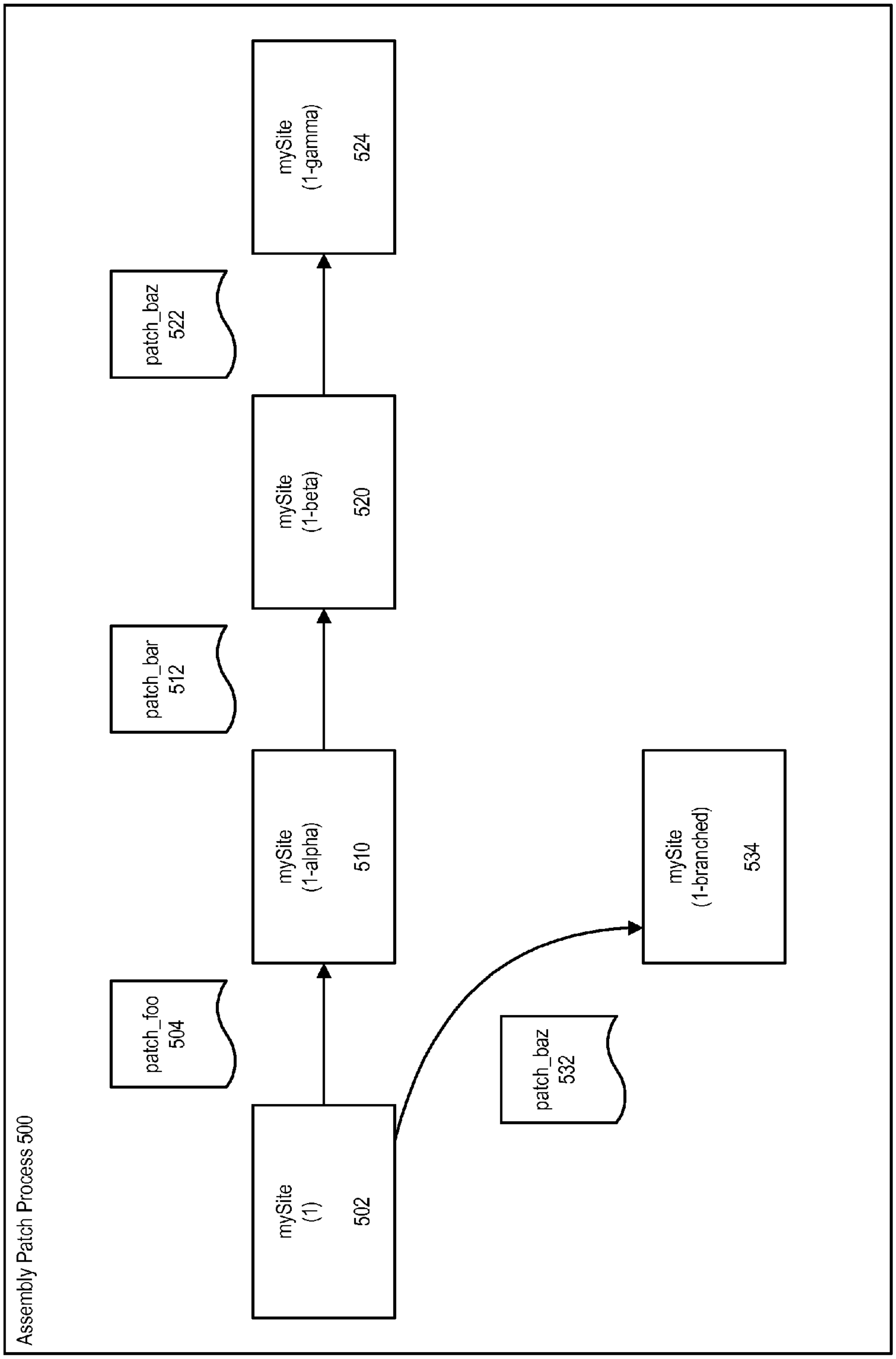
FIG. 8 further illustrates an assembly patch process, in accordance with an embodiment.

FIG. 8 further illustrates an assembly patch process, in accordance with an embodiment. As shown in FIG. 8, a base assembly archive version together with its descendents form a patch family, within which family non-linear patching can be performed.

For example, given the same assembly archive version sequence mySite_1, mySite_1-alpha, and mySite_1-beta as described above, another patch "baz" 522, 532 can be uploaded and applied to both mySite_1 (534) and mySite_1-beta (524). Each of the nodes shown in FIG. 8 is again an assembly archive revision that can be registered and deployed, and each deployed assembly instance will be associated with a specific version of an assembly archive.

Figure 9:
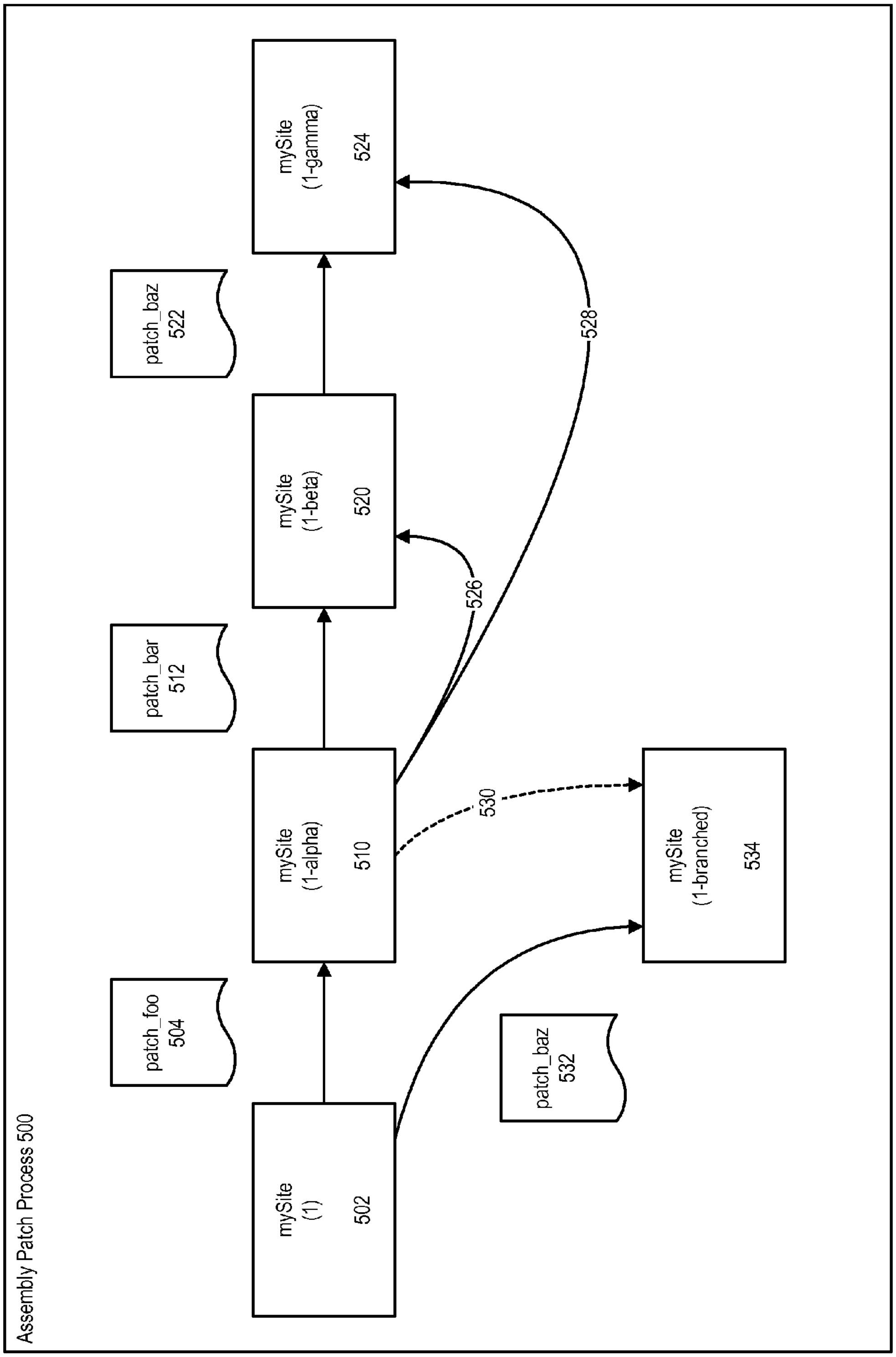
FIG. 9 further illustrates an assembly patch process, in accordance with an embodiment.

FIG. 9 further illustrates an assembly patch process, in accordance with an embodiment. As shown in FIG. 9, each of the nodes shown therein is similarly an assembly archive revision that can be registered and deployed. However, when patching an existing assembly instance, it is only possible to patch the instance to a descendant revision.

For example, if an assembly instance was created from mySite_1-alpha, then it can be patched to 1-beta (526) or to 1-gamma (528), but not to 1-branched (530), since the disk images that make up 1-branched will not contain the prior patches from 1-alpha.

In accordance with an embodiment, configuring the virtual assembly builder to enforce restrictions on patch families and assembly versions, while patching assemblies, ensures that instance patching can generally progress in a cumulative manner.

In accordance with various embodiments, in addition to the baseline binary-patching scenario and operations described above, the system can support different and/or additional patching-related operations, such as downloading, deleting or describing assembly patches, some examples of which are described below. In accordance with other embodiments, different and/or additional patching-related operations and functionality can be provided.

Patch Instance Rollback

In accordance with an embodiment, when an instance is patched to a new revision, the virtual assembly builder maintains the original virtual disks for the instance. If the overall patch operation fails, the instance can be automatically rolled back to the original version.

If a patch operation succeeds from the perspective of the virtual assembly builder, but a user subsequently determines that the instance is not healthy, then the instance can be manually rolled back to the prior version.

In accordance with an embodiment, by rolling back a patch, the assembly returns to the last-used disk images, instead of the patch images. The patched volumes can then be deleted, and the previous/old un-patched volumes attached to the appliances. An example usage of a Rollback-PatchInstance operation is shown below:

```
rollbackPatchInstance -assemblyId -connectionName
[-waitForComplete] [-pollTime]
```

In accordance with an embodiment, rolling back can be supported by a snapshotting feature, such as that provided by OVAB. Assemblies can be snapshotted before being patched, and in case a rollback is required, the instance can be restored to that snapshot.

In accordance with an embodiment, a rollback operation can include, for each patched disk, swapping to the old disk; discarding any created volumes; removing the patch entry from, e.g., AssemblyInstance-Patch-Cache; and setting the assembly version to the old version.

Archive Patch History

In accordance with an embodiment, a DescribeAssemblyArchives API method can be provided to return information about the patch history of an assembly archive. For example, if an archive was generated as the result of one or more patch applications, a DescribeAssemblyArchives operation will return the sequence of archive versions and patch IDs that resulted in the current version, starting at the originally-uploaded version.

Instance Patch History

In accordance with an embodiment, a DescribeAssemblyInstances API method can be provided to return information about the patch history of an instance. For example, if an instance has had one or more patches applied to it, then a DescribeAssemblyInstances operation will return the sequence of versions that the instance has been patched to, starting at the originally-deployed version.

Unregistering a Patched Archive

In accordance with an embodiment, unregistering a patched assembly archive implicitly unregisters the patched disk images from the underlying target. After the patched archive is unregistered, it will not be available for patching deployed assembly instances. Unregistering will remove any patched images snapshots after removing the server templates.

Deleting a Patch from the Deployer Repository

In accordance with an embodiment, a DeletePatch operation removes a specified patch (including all relevant resource files associated with the patch) from the local VAB repository. A given patch may not be deleted if there are any patched assembly archives based on this patch, since the virtual assembly builder must maintain the patch metadata. An example usage of the DeletePatch operation is shown below:

deletePatch -assemblyName -assemblyVersion -patchName -connectionName

In accordance with an embodiment, deleting a patch includes deleting the images and all related patch data from the local repository. After deletion, the patch would no longer be applicable. In accordance with an embodiment, the operation includes validating that the patch is not registered to any target, and removing the patch folder.

Describing Patches

In accordance with an embodiment, a DescribePatches operation describes the patches uploaded to the local repository, for example all patches in the repository, or patches for a specific assembly. An example usage of the DescribePatches operation is shown below:

describePatches [-assemblyName -assemblyVersion] -connectionName

Scale Up of Assembly Instance

In accordance with an embodiment, scaling up a patched assembly instance creates a patched appliance. In the event a local (non-shared) disk was patched, rolling back the patch after that operation may not be possible, since a snapshot of this appliance may not exist. Scaling up an un-patched assembly instance creates an un-patched appliance.

Remote Script Execution

In accordance with an embodiment, an ExecuteCommand operation provides the ability to have an appliance instance (e.g., as executing at a VM) execute a shell command, optionally referencing files that were uploaded to the appliance instance. In accordance with an embodiment, this is an asynchronous operation, including that when a request is initiated, the VAB deployer will return a request ID which a user can use to query the status of the request.

For example, this operation may be used to support types of patching that are not directly supported by the virtual assembly builder (e.g., OS patching, or configuration patching). Because this is not considered a true 'patch operation', the system cannot reverse a remote script execution analogous to the manner in which a patch can be rolled back as described above.

Similarly, if remote scripts are run on an assembly instance, a subsequent scale up operation will not automatically run the scripts on the newly added appliances. An example usage of the ExecuteCommand operation is shown below:

```
executeCommand -applianceInstanceId -scriptPlan
        -connectionName [-waitForComplete] [-pollTime]
```

Uploading a Payload to the VAB Repository

In accordance with an embodiment, an UploadPayload operation stores a payload in the virtual assembly builder's local VAB repository. The payload name is unique in the context of the assembly version.

This operation is a pre-requisite for later allowing a user to send a payload to potentially multiple appliance instances of the assembly, or potentially different/multiple assembly instances. An example usage of the UploadPayload operation is shown below:

```
uploadPayload -assemblyName -assemblyVersion -payloadName
        -payloadFile -connectionName
```

In accordance with an embodiment, uploading a payload to the local repository includes uploading the payload, and saving it in the VAB repository file system, in a directory [assembly]/[version]/payloads/[payload-name].

Sending a Payload to Appliance Instance

In accordance with an embodiment, a SendPayload operation performs an actual file transfer from the VAB repository to a VM hosting the assembly instance. After the operation is complete the file will have been placed in a predefined location accessible to the VM.

In accordance with an embodiment, this is an asynchronous operation, including that when a request is initiated, the VAB deployer will return a request ID which a user can use to query the status of the request. An example usage of the SendPayload operation is shown below:

```
sendPayload -applianceInstanceIds -destinations -payloadName
        -connectionName [-waitForComplete] [-pollTime]
```

In accordance with an embodiment, sending the payload to the appliance instance includes interacting with the appliance OS, optionally backed by CEE; creating an ISO out of the payload, and attaching and mounting it to the appliance; copying the file to a local disk; importing the ISO into the target; attaching the ISO to the VM; mounting the ISO, and copying the file into the specified location; unmounting it; and detaching and removing the volume/ISO.

Deleting a Payload from the VAB Repository

In accordance with an embodiment, a DeletePayload operation causes any payload associated files to be removed from the repository. An example usage of the DeletePayload operation is shown below:

deletePayload -assemblyName -assemblyVersion -payloadName -connectionName

Describing Payloads in the VAB Repository

In accordance with an embodiment, a DescribePayloads operation displays the list of payloads uploaded to the local repository. A user can specify an assembly and/or payload name to filter the results. An example usage of the DescribePayloads operation is shown below:

```
describePayloads [-assemblyName -assemblyVersion]
        [-payloadName] -connectionName
```

Remotely Running a Script

In accordance with an embodiment, to allow executing arbitrary commands remotely, the system can leverage the CEE daemon associated with an appliance and installed and running on the target VM, to execute a script's command list.

ovab:ScriptPlan

This is a mandatory root element, and contains one or more ovab:Command elements that will be executed sequentially. Attributes include version, and scheme version, for backwards compatibility.

ovab:Command

This is a mandatory child element of ovab:ScriptPlan element, and holds the command to be executed on the remote VM.

An example script is shown below:

```
<?xml version="1.0" encoding="UTF-8" standalone="yes"?>
<ovab:ScriptPlan version="1.0">
<ovab:Command>rm -rf /</ovab:Command>
<ovab:Command>touch /me</ovab:Command>
</ovab:ScriptPlan>
```

Assembly Volume Patching

The description of assembly patching by way of replacing or swapping virtual disks, as described above, generally describes a process that can be used with standard virtual disks, whose images are contained in an assembly archive and can be instantiated as virtual block devices in a virtualization target.

In accordance with an embodiment, the system can also support the use of assembly-level shared volumes, which can be automatically provisioned on, e.g., an Oracle ZFS storage target, and mounted on appropriate appliances over NFS.

In accordance with an embodiment, the virtual assembly builder can support patching of such assembly volumes using the same operations as described above. If the original assembly archive is already registered (i.e., a share containing the volume data exists on the storage target), then the patched volume can be created as a shadow clone of the existing share, making the patching process very space-efficient. During instance patching, each appliance instance's shared volume mount target can be updated, followed by a restart of the appliance for the mount target change to take effect.

Figure 10:
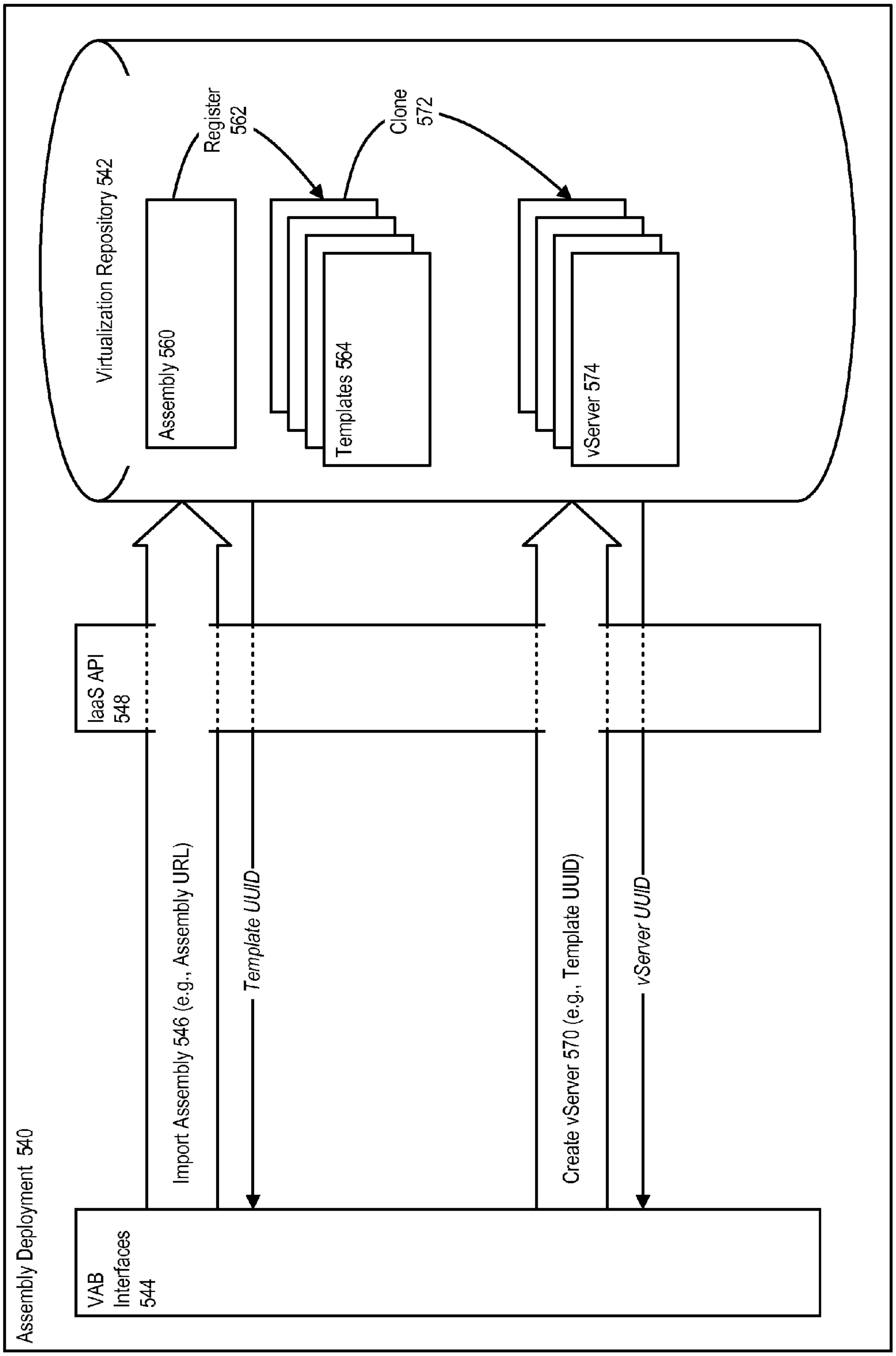
FIG. 10 illustrates a virtual assembly deployment, for use with assembly patching, in accordance with an embodiment.

FIG. 10 illustrates a virtual assembly deployment 540, for use with patching, in accordance with an embodiment.

As shown in FIG. 10, in accordance with an embodiment, the VAB interfaces 544 together with an IaaS API 548 can provide access to a virtualization repository 542, which includes assembly instance volumes.

In accordance with an embodiment, an import assembly 546 command can be executed (e.g., by specifying an assembly URL) to register 562 an assembly 560 with one of a plurality of templates 564. A create vServer command 570 (e.g., by specifying a template UUID) can be executed to clone 572 the assembly into a virtual server 574.

With such assembly deployment, direct volume addressing is not required. Instead, during deployment, to generate volumes for the new appliance, the IaaS can leverage the underlying virtualization system's (e.g., OVM) disk image cloning functionality. The virtual assembly builder is not required to reference the volume, and the cloned disk images need not be surfaced to the virtual assembly builder, which instead acts as an IaaS user.

Figure 11:
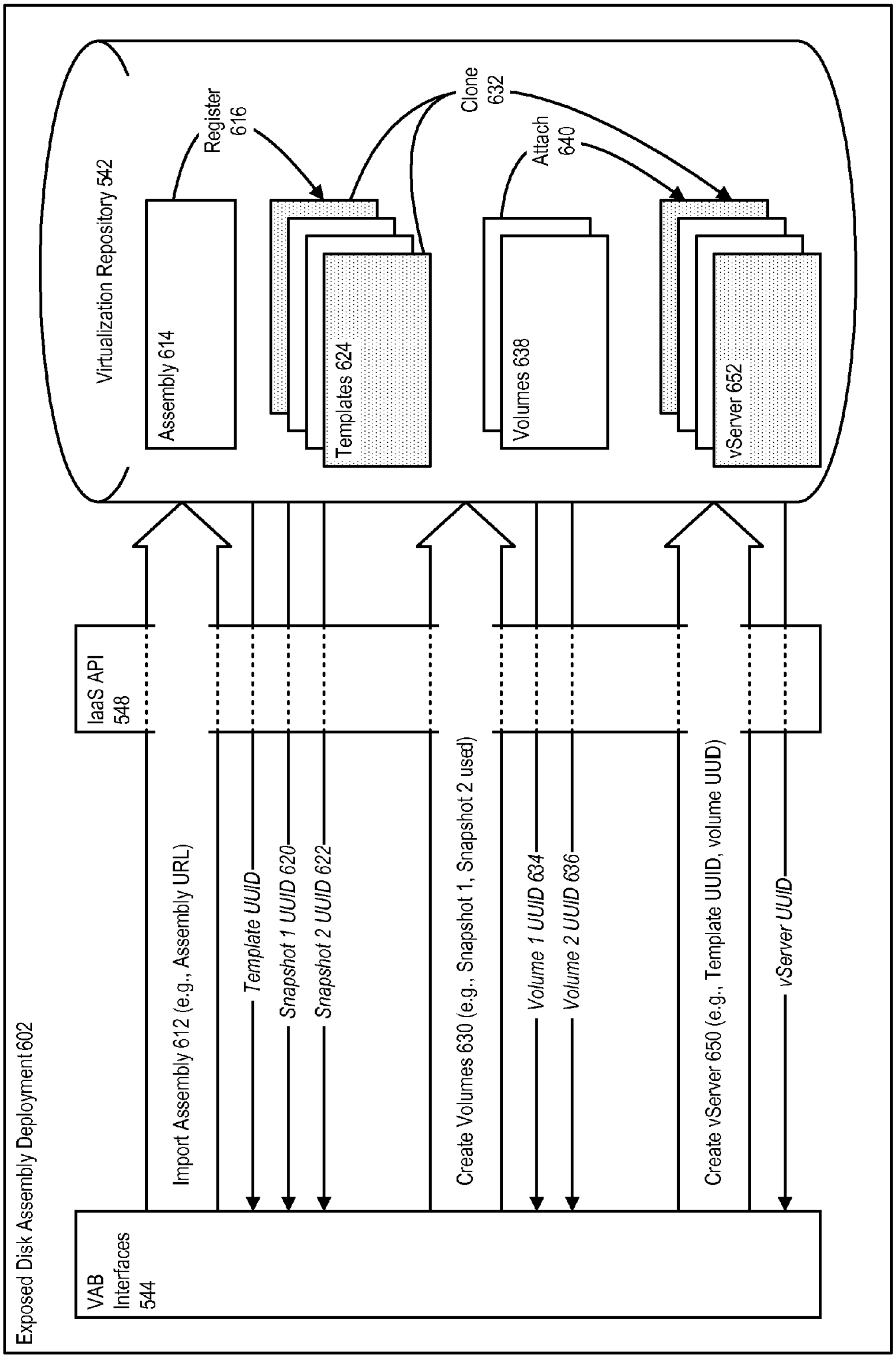
FIG. 11 illustrates a virtual assembly exposed disk deployment, for use with assembly patching, in accordance with an embodiment.

FIG. 11 illustrates a virtual assembly exposed disk deployment 602, for use with patching, in accordance with an embodiment.

As shown in FIG. 11, in accordance with an exposed disks embodiment, the user has more control over the topology, including that they can manually create volumes and associate references with them, and can perform any subsequent desired action, such as snapshotting, detachment, or re-attachment.

In accordance with an embodiment, an import assembly 612 command can be executed as before (e.g., by specifying an assembly URL), to register 616 an assembly 614 with one of a plurality of templates 624.

During assembly archive creation, disk entries in the assembly definition can be marked with a custom tag, e.g., ovm:shared=true. This tag can be recognized by IaaS during registration, causing IaaS to automatically create snapshots 620, 622 for each of those disks, and to expose them to the virtual assembly builder, which acts as an IaaS user.

Before creating a new assembly instance out of the registered template, the virtual assembly builder can use 630 the IaaS API, to manually create volumes 638 out of the snapshots, and then pass references 634, 636 for those volumes to IaaS's assembly creation command (650), causing it to use the manually cloned volumes 632, 640 for the VM 652.

In accordance with an embodiment, the patching-related operations described above, can be similarly used with the assembly-level shared volumes.

Example Patch Structure

As described above, in accordance with an embodiment, assembly patching leverages the virtual assembly builder's knowledge of an assembly structure, and its ability to manage virtual disks that are attached to an assembly instance. In accordance with an embodiment, the assembly patch structure can be compatible with OVAB virtual assembly builder. In accordance with other embodiments and other virtual assembly builder environments, alternative patch structures can be used.

In accordance with an embodiment, an assembly patch can be provided as a patch archive file (e.g., a zip file), which contains one or more native patch files (e.g., OPatches), a patch.xml metadata descriptor, a patch metadata specified for each appliance, a list of patches to be applied, and optionally a list of configuration files to migrate. For example, in accordance with an embodiment, a patch.xml metadata can include as nodes:

Namespace

For example, xmlns:ovab="http://vvww.oracle.com/ovab/deployer/patch"

ovab:assembly-patch

This is the root element, and holds a list of appliances. Attributes can include schemaVersion, to provide future backwards compatibility.

ovab:appliance

This element that describes the data for patching an appliance. This element must be a direct child of ovab:assembly-patch.

ovab:appliance-path

This element specifies the appliance-path. This element must be a direct child of ovab:appliance.

ovab:config-migration

These one or more optional elements specify a list of file sets to be copied from unpatched disks into patched disks. These elements must be a direct child of ovab:appliance.

ovab:file-set

This element describes files to copy from the unpatched disk into the patched disk. This element must be a direct child of ovab:config-migration. Attributes can include the location of the file that needs to be copied.

ovab:oracle-home

This element describes the location of the, e.g., Oracle Home, in the appliance filesystem. This element must be a direct child of ovab:appliance.

ovab:patch

These one or more elements describe a list of patches that should be applied on the appliance. These elements must be a direct child of ovab:appliance.

An example patch.xml metadata for use with an OVAB embodiment is provided below, for purposes of illustration. In accordance with other embodiments, different patch structures, metadata, and combinations of elements can be used.

```
<?xml version="1.0" encoding="UTF-8" standalone="yes"?>
<ovab:assembly-patch
xmlns:ovab="http://www.oracle.com/ovab/deployer/patch"
schemaVersion="1.0.0">
<ovab:appliance>
<ovab:appliance-path>s22assembly/myOHS</ovab:appliance-path>
<ovab:appliance-type>
<ovab:creator>wls</ovab:creator>
</ovab:appliance-type>
<ovab:config-migration>
<ovab:file-set
file="/scratch/aime1/golden/webtier/Oracle_WT1/jdbc/hlo"/>
<ovab:file-set
file="/scratch/aime1/golden/webtier/Oracle_WT1/jdbc/gbye"/>
</ovab:config-migration>
<ovab:oracle-home>
/scratch/aime1/golden/webtier/Oracle_WT1</ovab:oracle-home>
<ovab:patch>opatch-100.zip</ovab:patch>
<ovab:patch>opatch-101.zip</ovab:patch>
</ovab:appliance>
</ovab:assembly-patch>
```

Example Patch Formats

In accordance with an embodiment, the system can use, e.g., Oracle OPatch, as a patch format, which can be used to patch, e.g., Oracle FMW systems. Alternative patch formats can be supported, for example by wrapping the patches with a metadata that maps the patch information to a specific assembly structure.

In accordance with various embodiments, patches can be provided in alternative formats, for example, as a zip overlay, in which a pseudo-patch format is provided as a zip archive of files overlaid on top of an existing disk image; a zip replacement, in which a pseudo-patch format includes a zip archive of files that will replace the entire contents of the original disk, allowing for wholesale replacement of a disk (which is useful, e.g., with JDK updates that do not have a well-defined binary patch format); or an RPM update, which is installable on a mounted disk image and supports the use of offset installation paths.

Figure 12:
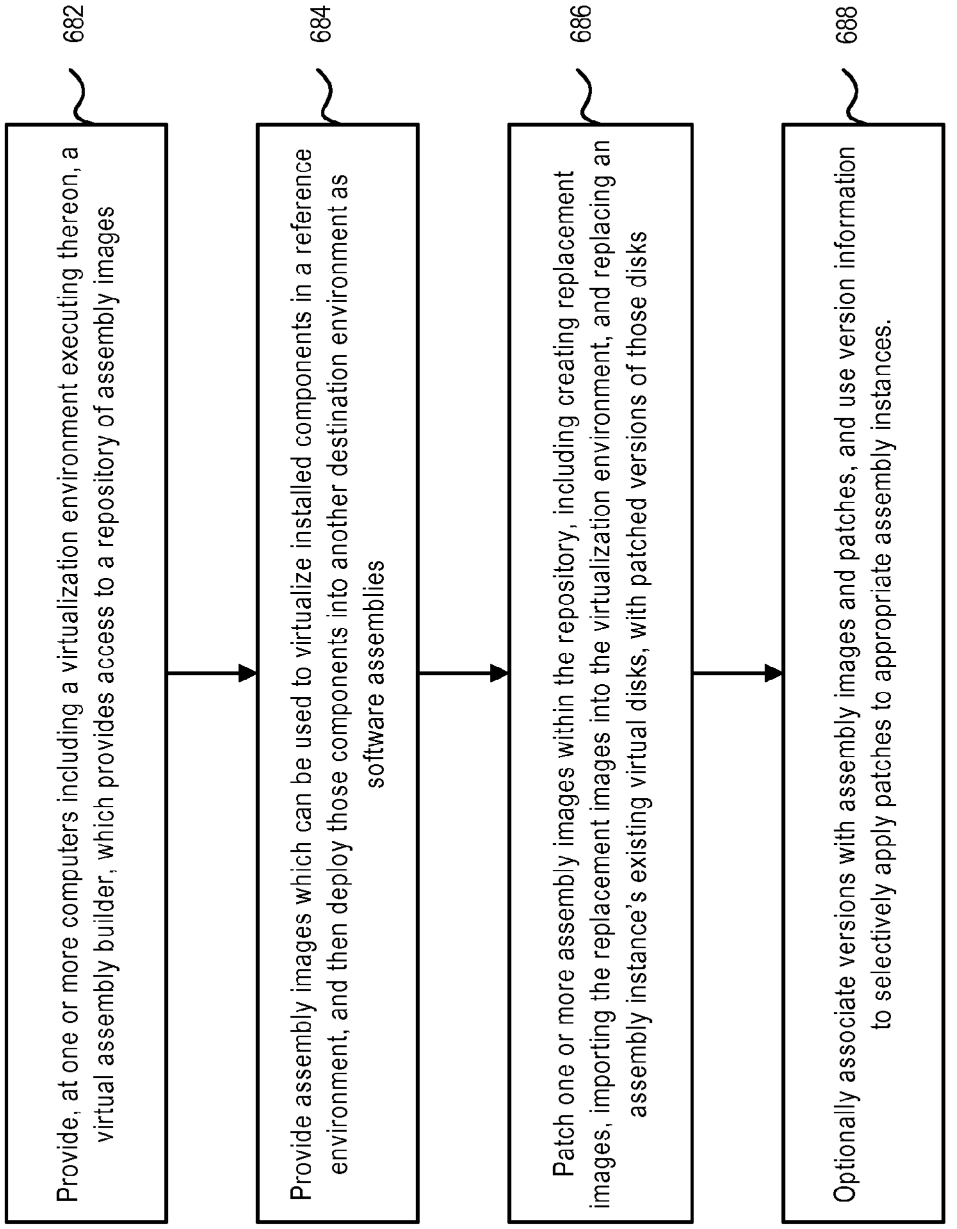
FIG. 12 is a flowchart of a process for virtual assembly patching, in accordance with an embodiment.

FIG. 12 is a flowchart of a process for virtual assembly patching, in accordance with an embodiment. As shown in FIG. 12, at step 682, one or more computers including a virtualization environment executing thereon are provided, together with a virtual assembly builder which provides access to a repository of assembly images.

At step 684, assembly images can be used to virtualize installed components in a reference environment, and then deploy those components into another destination environment as software assemblies.

At step 686, one or more assembly images within the repository can be patched, including creating replacement images, importing the replacement images into the virtualization environment, and replacing an assembly instance's existing virtual disks, with patched versions of those disks.

At step 688, the system allows for optionally associating versions with assembly images and patches, and uses the version information to selectively apply patches to appropriate assembly instances.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for virtual assembly patching, comprising: one or more computers having executing thereon a virtualization environment and a virtual assembly builder; and a repository of assembly archives and one or more patches, wherein each assembly archive defines an assembly as a collection of software appliances that are configured to work together upon deployment, and wherein each software appliance represents a software component, and is associated with a metadata that includes a description of the software component's input and output endpoints; wherein the virtual assembly builder enables registration of the assembly archives, and controls patching of the assembly archives within a family of archive versions having a base archive version and one or more descendant archive versions, for use in patching of an assembly instance associated with a virtual disk and existing disk image, including building a replacement disk image that includes a patched assembly archive within the family of archive versions, importing the replacement disk image into the virtualization environment, and replacing the virtual disk associated with the assembly instance with a patched version of that virtual disk; wherein when an original assembly archive is patched to create a new assembly archive, the virtual assembly builder tracks a relationship between the original assembly archive and the new assembly archive, for use in enforcing restrictions on patch families and assembly versions while patching assembly instances.

2. The system of claim 1, wherein the virtual assembly builder accesses the repository via an application program interface that supports operations to patch a particular assembly archive and subsequently apply the patch to a corresponding assembly instance.

3. The system of claim 1, wherein the assembly archives are stored in one or more disk volumes which are tagged and referenced, and wherein the virtual assembly builder applies patches to snapshots of the disk volumes which are then used to patch virtual assembly instances.

4. A method of providing virtual assembly patching, comprising: providing, at one or more computers, a virtualization environment and a virtual assembly builder; providing a repository of assembly image archives and one or more patches, wherein each assembly archive defines an assembly as a collection of software appliances that are configured to work together upon deployment, and wherein each software appliance represents a software component, and is associated with a metadata that includes a description of the software component's input and output endpoints; and providing access by the virtual assembly builder to the repository, to enable registration of the assembly archives, and control patching of the assembly archives within a family of archive versions having a base archive version and one or more descendant archive versions, for use in patching an assembly instance associated with a virtual disk and existing disk image, including building a replacement disk image that includes a patched assembly archive within the family of archive versions, importing the replacement disk image into the virtualization environment, and replacing the virtual disk associated with the assembly instance with a patched version of that virtual disk; wherein when an original assembly archive is patched to create a new assembly archive, the virtual assembly builder tracks a relationship between the original assembly archive and the new assembly archive, for use in enforcing restrictions on patch families and assembly versions while patching assembly instances.

5. The method of claim 4, wherein the virtual assembly builder accesses the repository via an application program interface that supports operations to patch a particular assembly archive and subsequently apply the patch to a corresponding assembly instance.

6. The method of claim 4, wherein the assembly archives are stored in one or more disk volumes which are tagged and referenced, and wherein the virtual assembly builder applies patches to snapshots of the disk volumes which are then used to patch assembly instances.

7. A non-transitory computer readable storage medium, including instructions stored thereon which when read and executed by one or more computers cause the one or more computers to perform the steps comprising: providing, at one or more computers, a virtualization environment and a virtual assembly builder; providing a repository of assembly image archives and one or more patches, wherein each assembly archive defines an assembly as a collection of software appliances that are configured to work together upon deployment, and wherein each software appliance represents a software component, and is associated with a metadata that includes a description of the software component's input and output endpoints; and providing access by the virtual assembly builder to the repository, to enable registration of the assembly archives, and control patching of the assembly archives within a family of archive versions having a base archive version and one or more descendant archive versions, for use in patching an assembly instance associated with a virtual disk and existing disk image, including building a replacement disk image that includes a patched assembly archive within the family of archive versions, importing the replacement disk image into the virtualization environment, and replacing the virtual disk associated with the assembly instance with a patched version of that virtual disk; wherein when an original assembly archive is patched to create a new assembly archive, the virtual assembly builder tracks a relationship between the original assembly archive and the new assembly archive, for use in enforcing restrictions on patch families and assembly versions while patching assembly instances.

8. The non-transitory computer readable storage medium of claim 7, wherein the virtual assembly builder accesses the repository via an application program interface that supports operations to patch a particular assembly archive and subsequently apply the patch to a corresponding virtual assembly instance.

9. The non-transitory computer readable storage medium of claim 7, wherein the assembly archives are stored in one or more disk volumes which are tagged and referenced, and wherein the virtual assembly builder applies patches to snapshots of the disk volumes which are then used to patch assembly instances.

10. The system of claim 1, wherein creating the replacement disk image includes importing metadata of the existing disk image and providing updated metadata in the replacement disk image.

11. The system of claim 1, wherein the system associates versions with assembly archives and patches, and uses version information to selectively apply a patch to appropriate assembly instances, and wherein selective application of the patch to the appropriate assembly instances includes ascertaining version information for the existing disk image and that the replacement disk image includes a descendant version resulting from a cumulative series of patches applied to a base assembly version.

12. The method of claim 4, wherein creating the replacement disk image includes importing metadata of the existing disk image and providing updated metadata in the replacement disk image.

13. The method of claim 4, further comprising associating versions with assembly archives and patches, and using version information to selectively apply a patch to appropriate assembly instances, wherein selective application of the patch to the appropriate assembly instances includes ascertaining version information for the existing disk image and that the replacement disk image includes a descendant version resulting from a cumulative series of patches applied to a base assembly version.

14. The non-transitory computer readable storage medium of claim 7, wherein the creating the replacement disk image includes importing metadata of the existing disk image and providing updated metadata in the replacement disk image.

15. The non-transitory computer readable storage medium of claim 7, further comprising associating versions with assembly archives and patches, and using version information to selectively apply a patch to appropriate assembly instances, wherein selective application of the patch to the appropriate assembly instances includes ascertaining version information for the existing disk image and that the replacement disk image includes a descendant version resulting from a cumulative series of patches applied to a base assembly version.

16. The system of claim 1, wherein the virtual assembly builder includes a deployer having a virtual assembly manager that enables access to the repository, and a registration manager that provides access to a resource pool service.

17. The system of claim 16, wherein the virtual assembly builder includes an application program interface that enables registration of assemblies and lifecycle management of the assemblies.

18. The system of claim 17, wherein registration of a particular assembly includes registering one or more templates associated with the particular assembly with a resource pool.

19. The system of claim 17, wherein the application program interface communicates with a command execution engine that handles a specific set of messages from the application program interface, and executes commands in response thereto, to patch assembly instances.

* * * * *

UNITED STATES PATENT AND TRADEMARK OFFICE

CERTIFICATE OF CORRECTION

PATENT NO. : 9,690,566 B2
APPLICATION NO. : 14/213936
DATED : June 27, 2017
INVENTOR(S) : Patrick Vinograd et al.

It is certified that error appears in the above-identified patent and that said Letters Patent is hereby corrected as shown below:

In the Specification

Column 17, Line 60, delete "vvww" and insert -- www --, therefor.

In the Claims

In Column 20, Line 25, in Claim 3, after "patch", delete "virtual".

In Column 21, Line 31, in Claim 8, after "corresponding", delete "virtual".

Signed and Sealed this
Twenty-second Day of October, 2019

Andrei Iancu
*Director of the United States Patent and Trademark Office*